United States Patent
Hess

(10) Patent No.: US 7,096,176 B1
(45) Date of Patent: Aug. 22, 2006

(54) OPTICAL ROUTE DESIGN SYSTEM AND METHOD FOR ANALYZING THE PERFORMANCE OF AN OPTICAL FIBER TRANSMISSION PATH

(75) Inventor: Cory D. Hess, Richardson, TX (US)

(73) Assignee: Alcatel, Paris (FR)

( * ) Notice: Subject to any disclaimer, the term of this patent is extended or adjusted under 35 U.S.C. 154(b) by 899 days.

(21) Appl. No.: 09/833,119

(22) Filed: Apr. 11, 2001

Related U.S. Application Data

(60) Provisional application No. 60/251,205, filed on Dec. 4, 2000.

(51) Int. Cl.
*G06G 7/62* (2006.01)

(52) U.S. Cl. .............................. 703/21; 703/13; 703/2; 703/22; 714/4; 709/220

(58) Field of Classification Search .................... 703/2, 703/21, 13; 370/404; 398/38

See application file for complete search history.

(56) References Cited

U.S. PATENT DOCUMENTS

| | | | | |
|---|---|---|---|---|
| 5,515,367 | A * | 5/1996 | Cox et al. .................... | 370/404 |
| 5,680,326 | A * | 10/1997 | Russ et al. ...................... | 714/4 |
| 5,760,940 | A * | 6/1998 | Frigo .......................... | 398/38 |
| 5,966,312 | A | 10/1999 | Chen | |
| 5,999,718 | A | 12/1999 | Wang et al. | |
| 6,047,118 | A * | 4/2000 | Sofman et al. ................ | 703/13 |
| 6,366,875 | B1 * | 4/2002 | Colizzi et al. ................. | 703/16 |
| 6,728,484 | B1 * | 4/2004 | Ghani .......................... | 398/42 |
| 6,728,486 | B1 * | 4/2004 | Hutchison et al. ............. | 398/83 |
| 6,763,326 | B1 * | 7/2004 | Watkins et al. ................ | 703/21 |
| 2002/0143927 | A1 * | 10/2002 | Maltz et al. ................. | 709/224 |
| 2003/0099014 | A1 * | 5/2003 | Egner et al. ................. | 359/124 |

FOREIGN PATENT DOCUMENTS

EP   0 584 848 A1   3/1994

OTHER PUBLICATIONS

"Network Simulations with OPNET", X. Chang, Proceedings of 1999 Winter Simulation Conference, IEEE 1999.*
"Simulation of Communications Networks", A.M. Law et al, Proceedings of 1996 Winter Simulation Conference, IEEE 1996.*
OPNET Modeler product brochure, Mil 3 Inc., 1999.*
"Planning of Optical Network", 2000 EURESCOM Project P709, Mar. 2000.*
"Issues in Modeling of Fiber Optic Systems", E. Conforti et al, Proceedings SBMO/IEEE MIT-S IMOC 95, IEEE 1995.*
"ASNT Network Simulation Tools Survey and Requirements", J. Koller et al, DARPA F30602-95-C-0296, Nov. 1995.*

(Continued)

*Primary Examiner*—Fred Ferris
(74) *Attorney, Agent, or Firm*—William J. Tucker; Jessica W. Smith; V. Lawrence Sewell

(57) ABSTRACT

An optical route design system and method are described that can effectively calculate and display for a user how much margin there is in a design of an optical span. Basically, the optical route design system has a processor capable of determining whether a design of an optical span is an operable optical span and also capable of performing a margin analysis on the operable optical span to determine how much change the operable optical span can tolerate before the operable optical span becomes an inoperable optical span. The optical route design system also includes a display capable of presenting the results of the margin analysis to a user.

7 Claims, 8 Drawing Sheets

OTHER PUBLICATIONS

"Wavelength-Routed Optical Networks: Linear Formulation, Resource Budgeting Tradeoffs, and a Reconfiguration Study", D. Baneerjee et al, IEEE/ACM Transactions on Networking, vol. 8, No. 5, Oct. 2000.*

"Optimal Capacity and Flow Assignment for Self-Healing ATM Networks Based on Line and End-to-End Restoration", K. Murakami et al, IEEE/ACM Transactions on Networking, vol. 6, No. 2, Apr. 1998.*

Vandoren, Vance; How Software Tools Simplify Loop Tuning; Control Engineering International; Cahners Publishing; Jan. 1, 1997; pp. 89-90, 92-94; vol. 44, No. 15.

Strinning; A Computerized Trial and Error Technique for Impeller Design; Scientific Impeller; 1995; pp. 19-27; No. 3.

* cited by examiner

OPTICAL ROUTE DESIGN SYSTEM AND METHOD FOR ANALYZING THE PERFORMANCE OF AN OPTICAL FIBER TRANSMISSION PATH

CLAIMING BENEFIT OF PRIOR FILED PROVISIONAL APPLICATION

This application claims the benefit of U.S. Provisional Application Ser. No. 60/251,205 filed on Dec. 4, 2000 and entitled "MARGIN ANALYSIS OF AN OPTICAL TRANSMISSION ROUTE" which is incorporated by reference herein.

BACKGROUND OF THE INVENTION

1. Field of the Invention

The present invention relates in general to the optical field and, in particular, to an optical route design system and method capable of determining how much margin there is in a design of an optical span.

2. Description of Related Art

In the fiber optic field, one of the more significant design challenges today involves the development of a new optical route design tool that can effectively simulate and test the design of an optical span (optical fiber transmission path). Traditional optical route design tools often have a user specify an "unallocated margin" that is to be incorporated into the design of an optical span. The "unallocated margin" is intended as a "safety factor" to ensure that a later built real optical span has enough "margin" or "robustness" so that it can properly operate even after fiber cuts are repaired or other changes are made which can impact the total loss or distance of the fiber optic transmission path.

The traditional optical route design tools specify the "unallocated margin" in terms of additional attenuation that is a part of each segment of fiber optic cable that make-up the total fiber optic transmission path. However, the additional attenuation of "unallocated margin" is imaginary, in that it does not exist in the real optical span unless future activities of some sort add attenuation to the real optical span. As such, the use of "unallocated margin" in designing an optical span can be problematical for at least two reasons: 1) there is always the issue of whether or not the specified "unallocated margin" is enough, not enough, or too much; and 2) the specifying of additional attenuation that is not really there affects the results of the simulation which could lead to inaccurate or misleading designs. In other words, traditional optical route design tools require the user to specify the amount of "unallocated margin" that is to be used in the design of an optical span which can result in the installation of a failure prone optical span or an under-utilized optical span. Accordingly, there is and has been a need for an optical route design system and method than can effectively calculate and tell a user how much margin there is in a design of an optical span instead of requiring the user estimate to for themselves how much margin there should be in an optical span. These needs and other needs are satisfied by the optical route design system and method of the present invention.

BRIEF DESCRIPTION OF THE INVENTION

The present invention includes an optical route design system and method than can effectively calculate and display for a user how much margin there is in a design of an optical span. Basically, the optical route design system has a processor capable of determining whether a design of an optical span is an operable optical span and also capable of performing a margin analysis on the operable optical span to determine how much change the operable optical span can tolerate before the operable optical span becomes an inoperable optical span. The optical route design system also includes a display capable of presenting the results of the margin analysis to a user.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Referring to FIGS. 1–4, there are disclosed a preferred embodiment of an optical route design system 100 and method 200 and 300 in accordance with the present invention. Basically, the optical route design system 100 can effectively calculate and tell a user how much margin there is in a particular design of an optical span instead of requiring the user to estimate for themselves how much margin there should be in an optical span. This way, the design of an optical span can be specified based on best-known real-world parameters without introducing any imaginary parameters such as "unallocated margin" into the optical span like there are in traditional optical route design tools.

Figure 1:
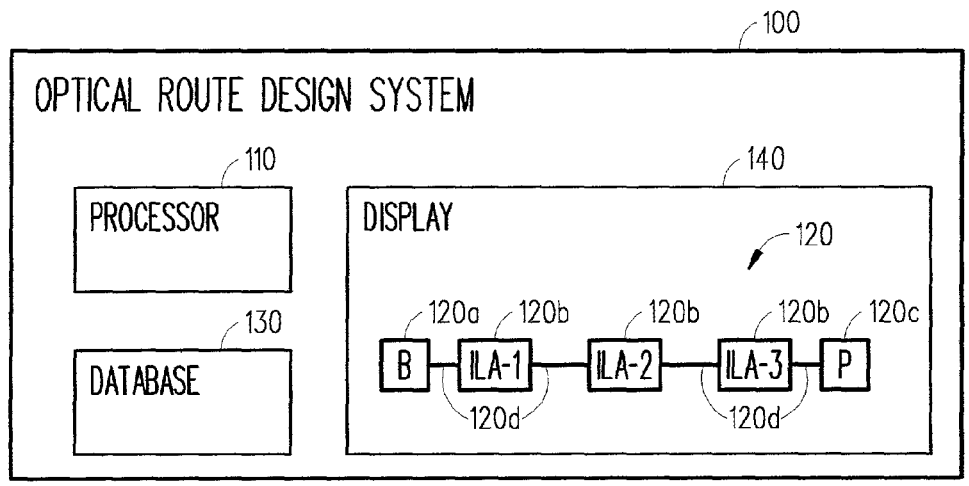
FIG. 1 is a block diagram illustrating the basic components of an optical route design system in accordance with the present invention.
Figure 2:
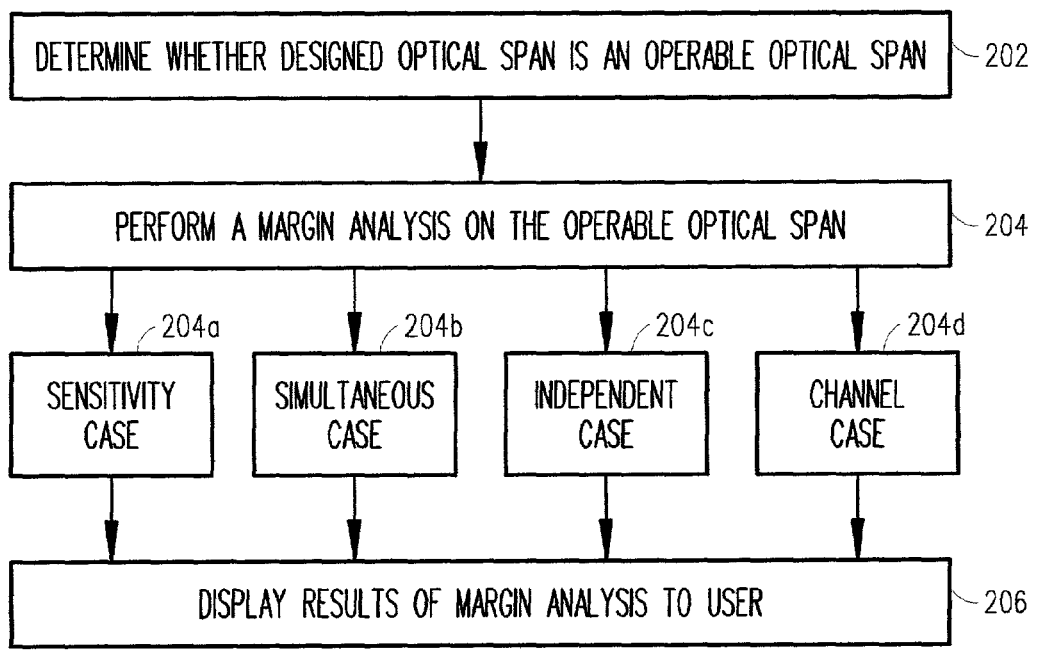
FIG. 2 is a flowchart illustrating the basic steps of a preferred method for determining how much margin there is in a design of an optical span in accordance with the present invention.

Referring to FIGS. 1 and 2, there are respectively illustrated an optical route design system 100 and preferred method 200 for determining how much margin there is in a design of an optical span in accordance with the present invention. The optical route design system 100 includes a processor 110 that enables a user to design an optical span 120. In designing the optical span 120, the user can select components that make-up the optical span 120 such as an optical booster amplifier (B) 120a, in-line amplifiers (ILA-1 thru ILA-3) 120b, an optical pre-amplifier (P) 120c and fiber optic cables 120d. As shown, each fiber optic cable 120d can have a different length and is located between a pair of amplifiers 120a, 120b and 120c. Information about the operational characteristics of each component 120a, 120b, 120c and 120d is stored in a database 130. The processor 110 can obtain this information from the database 130.

The optical route design system 100 then determines (step 202) whether the design of the optical span 120 is an operable optical span. To accomplish this, the processor 110 can use an optimizing routine (pre-emphasize routine) which is described in greater detail below with respect to FIGS. 3 and 4. Basically, the processor 110 can use the optimizing routine to determine whether a design of an optical span 120 is operable and can also use the optimizing routine to make an inoperable optical span into an operable optical span or to make an operable optical span even more efficient.

Assuming the design of the optical span 120 is an operable optical span, the processor 110 then performs (step 204) a margin analysis on the operable optical span to determine how much change the design of the operable optical span can tolerate before it becomes an inoperable optical span. More specifically, the processor 110 performs the margin analysis by automatically making a continuing series of user-defined changes to the design of the operable optical span and then analyzing the changed design after each iteration of a user-defined change to determine when the changed design fails to meet a predefined minimum performance criteria (e.g., a certain optical signal noise ratio (OSNR) or a certain received power value). In the preferred embodiment, the processor 110 in performing the margin analysis can make the user-defined changes such as an incremental change in the length of one or more fiber optic cables 120d to four basic case types. These case types are referred to as a sensitivity case (step 204a), simultaneous case (step 204b), independent case (step 204c) and channel case (step 204d).

The sensitivity case is one type of margin analysis where the processor 110 determines an allowable amount of change in a position of an in-line amplifier 120b (e.g., ILA-1) in the optical span 120 relative to adjacent amplifiers 120a, 120b or 120c (e.g., optical booster amplifier (B) 120a and ILA-2). The results of the sensitivity case tell the user how much any one site (e.g., ILA-1) can be moved before the design of the optical span 120 is no longer operational, assuming the other sites (e.g., B, ILA-2, ILA-3 and P) remain in their defined positions. This analysis can be done for every in-line amplifier 120b and is important to a user since the site locations are not always firmly determined at the time the optical span 120 is designed.

The simultaneous case is one type of margin analysis where the processor 110 determines an allowable amount of change that can be made in the lengths of all the segments of fiber optic cable 120d in the optical span 120. That is, each fiber optic cable 120d in the optical span 120 is iteratively changed by the same amount, at the same time, until the design fails. This case is useful in that it indicates the total amount of change that can be made to all segments of fiber optic cable 120d in the design before the design will no longer function properly.

The independent case is one type of margin analysis where the processor 110 determines an allowable amount of change in one segment of fiber optic cable 120d when there are no changes made to the remaining segments of the fiber optic cable 120d in the optical span 120. In other words, this case identifies the total amount that any one segment of fiber optic cable 120d in the design can change before the design fails, assuming that no changes occur in any of the other segments of fiber optic cable 120d in the design.

The channel case is one type of margin analysis where the processor 110 determines how many channels can be tolerated by the design of the optical span 120. The channel case does not involve changes to the loss or distance of the segments of fiber optic cable 120d. Rather, the channel case gives the user information as to how much the design can grow in terms of the number of channels before the basic design must change. The user can be able to specify whether the growth channels are OC-48, OC-192, or a mix. The analysis of this case can indicate the point at which higher-output amps are required (if applicable) and the point at which the growth is maximized.

Lastly, the optical route design system 100 includes a display 140 that can display the components of the optical span 120 and the results of the margin analysis to the user.

Figure 3A:
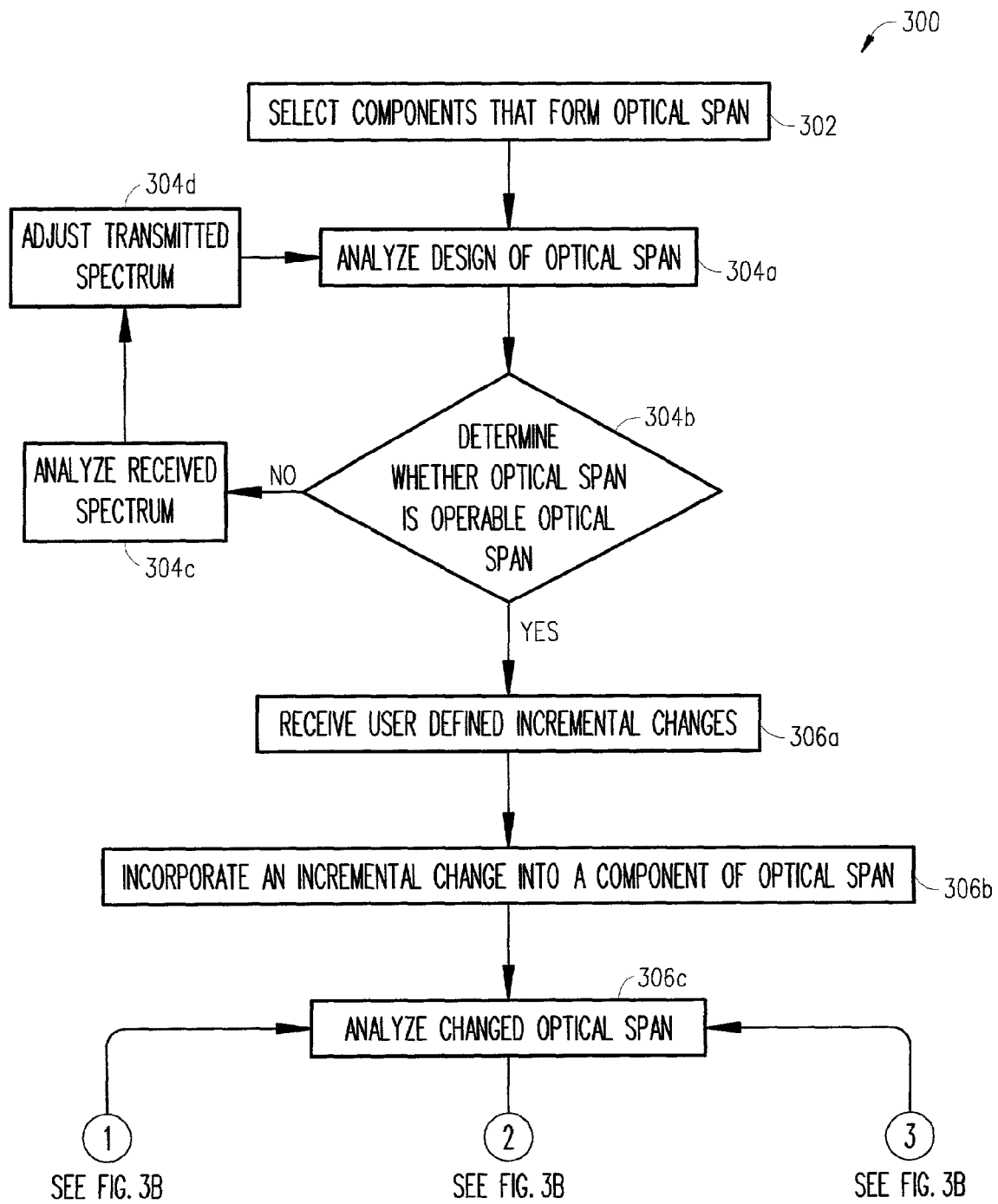
FIGS. 3A and 3B make-up a flowchart illustrating in greater detail the steps of a preferred method for determining how much margin there is in a design of an optical span in accordance with the present invention.
Figure 3B:
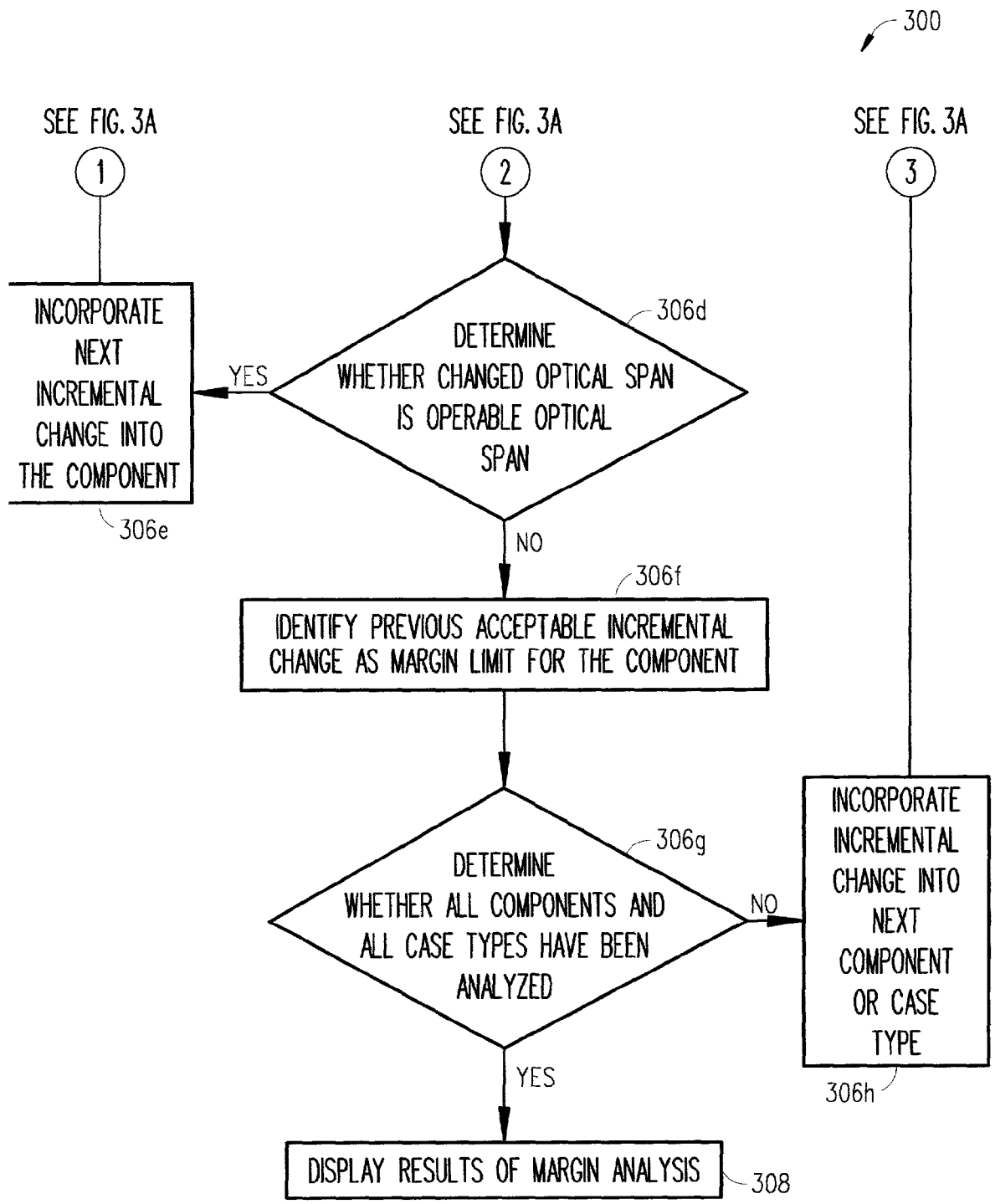

Referring to FIGS. 3A and 3B, there is a flowchart illustrating in greater detail the steps of a preferred method 300 capable of determining how much margin there is in a design of an optical span in accordance with the present invention. To better describe the present invention, FIGS. 4A–4J have been provided to show how an exemplary optical span 400 can be designed, optimized and margin analyzed in accordance with the present invention. The exemplary optical span 400 represents an optical transport DWDM system carrying 32 channels of OC-48 traffic.

Figures 4A, 4B:
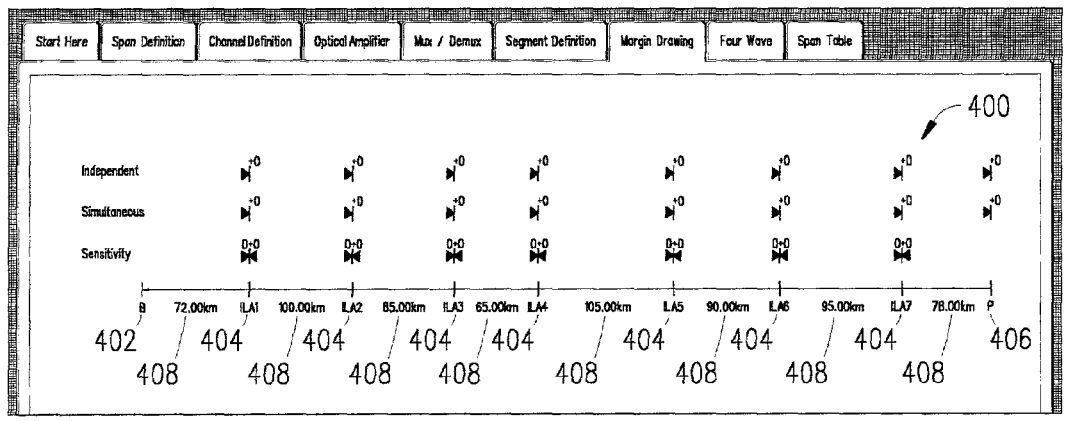
FIGS. 4A–4J are a variety of diagrams that are used to show how an exemplary optical span can be designed, optimized and margin analyzed in accordance with the present invention.

Beginning at step 302, the user interacts with the optical route design system 100 to select the components that make-up an optical span. The optical route design system 100 stores or has access to information on the operational characteristics of each component. FIGS. 4A and 4B show an exemplary optical span 400 that includes an optical booster amplifier (B) 402, seven in-line amplifiers (ILA-1 through ILA-7) 404, an optical pre-amplifier (P) 406 and eight fiber optic cables 408. Each fiber optic cable 408 or "segment" is located between a pair of amplifiers 402, 404 and 406. As shown, the exemplary optical span 400 has a total of eight (8) segments of fiber optic cables 408 having lengths of 72, 100, 85, 65, 105, 90, 95 and 78 kilometers, respectively. Since the margin analysis has not been done at this point in time, all the margin information for the sensitivity case, simultaneous case and independent case shown in FIG. 4A are at zero.

Figure 4C:
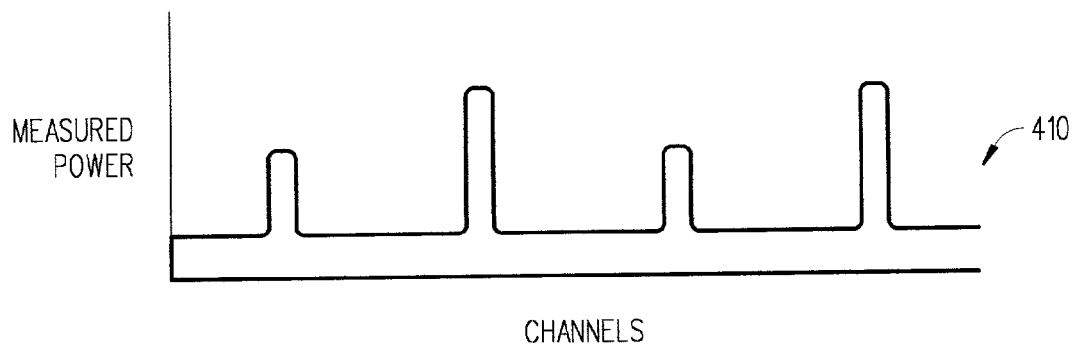
Figure 4D:
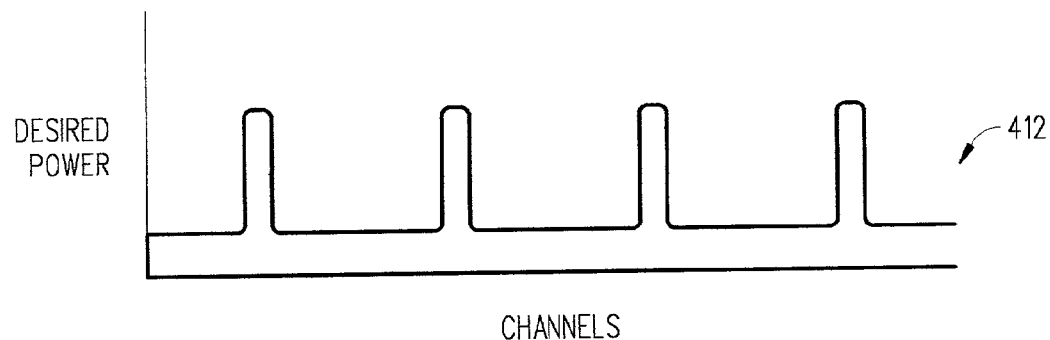

At step 304 (including steps 304a through 304d), the optical route design system 100 can use an optimizing routine to optimize the optical span 400. At steps 304a and 304b, the optical route design system 100 analyzes (step 304a) the design of the optical span 400 and determines (step 304b) whether the design of the optical span is an operable optical span. To determine whether the optical span is an operable optical span, the optical route design system 100 compares the received signal spectrum (e.g., received power) at the received end (e.g., optical pre-amplifier 406) of the optical span to a received signal spectrum that is desired at the received end of the optical span. FIGS. 4C and 4D respectively illustrate exemplary graphs of a measured power curve 410 at the received end of the optical span 400 and a desired measured power curve 412 at the received end of the optical span 400. These graphs illustrate an exemplary state of the optical span 400 before performing the optimizing steps 304c and 304d.

Figure 4E:
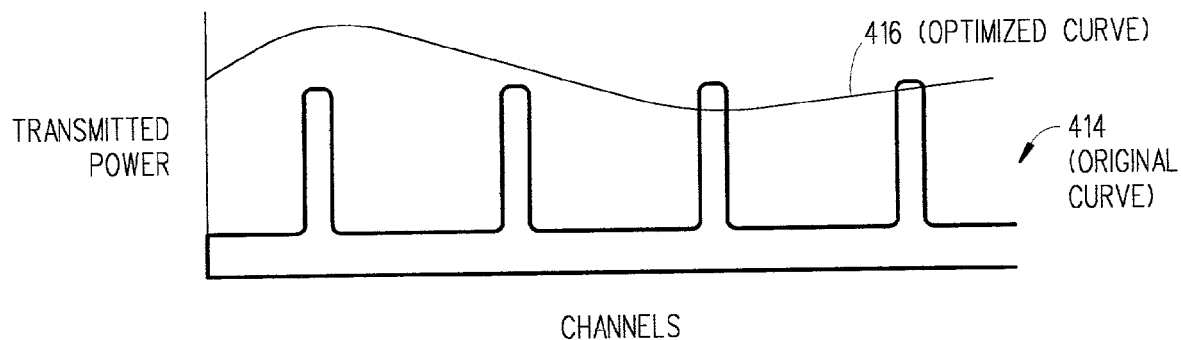

In the event, the optical route design system 100 determines that the measured received signal spectrum (e.g., measure power curve 410) does not match the desired received signal spectrum (e.g., desired measured power curve 412) then the optical route design system 100 proceeds to steps 304c and 304d. At steps 304c and 304d, the optical route design system 100 analyzes (step 304c) the measured received signal spectrum and adjusts (step 304d) the transmitted signal spectrum (e.g., transmitted power) at the front end (e.g., optical booster amplifier 402) of the optical span to improve the characteristics of the measured received signal spectrum. FIG. 4E shows how an original transmitted power output curve 414 can be adjusted to form an optimized transmitted power output 416 in an attempt to make the measured power curve 410 (FIG. 4C) look like the desired power curve 412 (FIG. 4D). Steps 304a through 304d can be repeated such that the measured received signal spectrum is continually analyzed and the transmitted signal spectrum is continually adjusted until there is an optimized and operable optical span based on the design of the optical span.

Figure 4F:
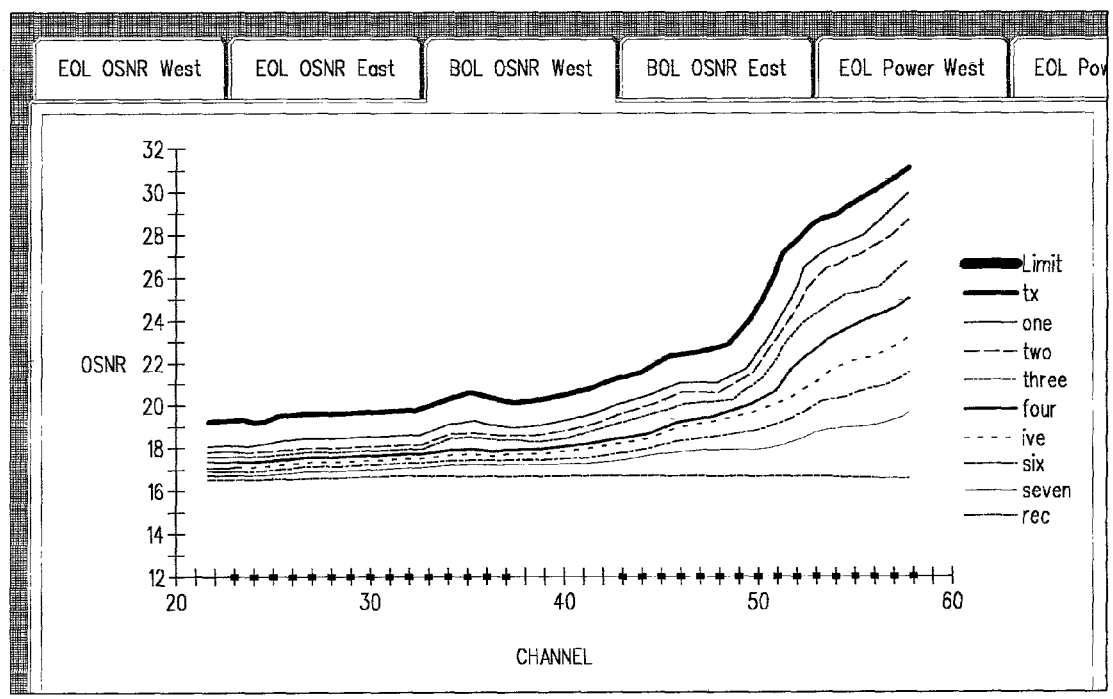

It should be understood that the optimizing routine can use OSNR measurements instead of received power measurements to optimize the optical span. FIG. 4F illustrates a graph the indicates the performance of the exemplary optical span 400 in terms of OSNR measurements that has been optimized in accordance with the optimizing step 304. It should also be understood the optimizing step 304 is optional and that the optical route design system 100 could operate effectively without performing the optimizing step 304 so long as the original design of the optical span is operable.

Figure 4G:
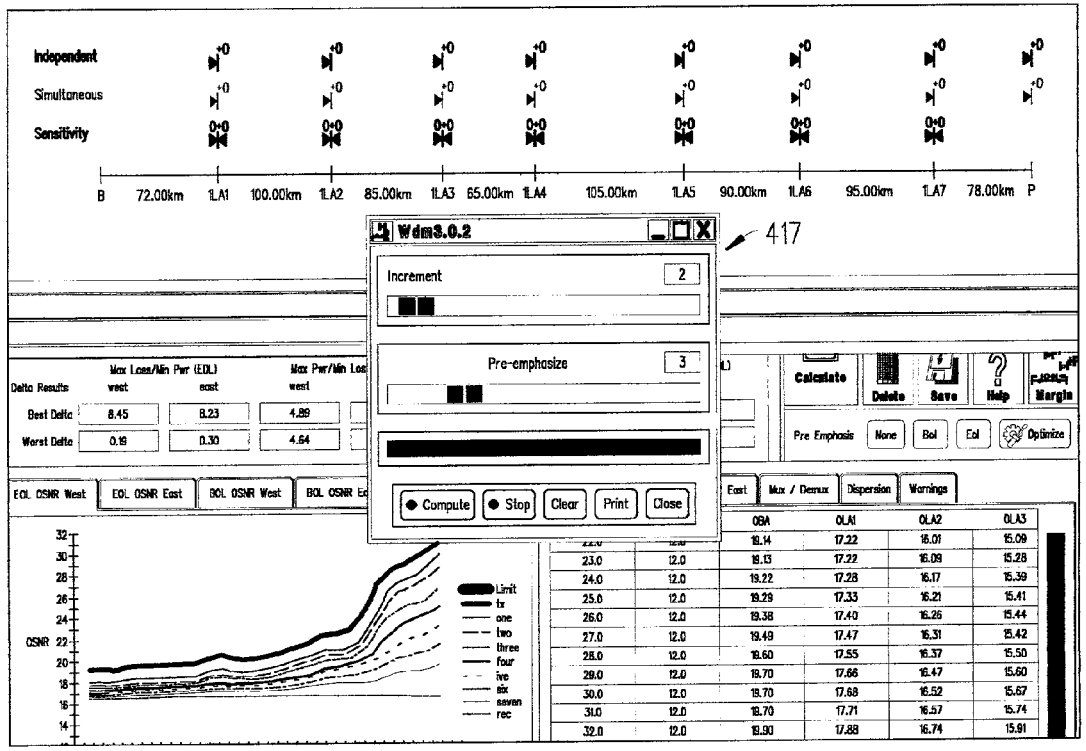

Assuming the design of the optical span has been optimized and is an operable optical span, then the method 300 proceeds to the margin analysis routine (step 306) where it is determined how much change the design of the operable optical span can tolerate before the operable optical span becomes an inoperable optical span. Beginning at step 306a, the optical route design system 100 receives at least one parameter from the user identifying the user-defined incremental changes that are to be made to the design of the operable optical span. To input these user-defined changes and invoke the margin analysis feature, the user can interact with a margin analysis control window 417 as illustrated in FIG. 4G. As shown in FIG. 4G, the user can input two types of user-defined changes referred to as "Increment" and "Pre-emphasize". "Increment" refers to the magnitude of change that is to be made to one or more components of the optical span during each iteration of the margin analysis (FIG. 4G shows an increment parameter of 2 kilometers). And, "Pre-emphasize" refers to the number of iterations that are performed during each optimization cycle which is described in greater detail below with respect to step 306c (FIG. 4G shows a pre-emphasize parameter set at 3).

Figure 4H:
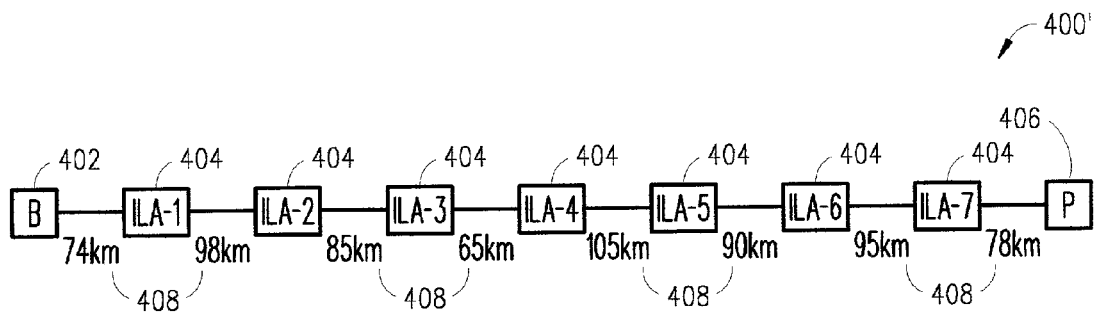

At step 306b, the optical route design system 100 incorporates an incremental change into a component (e.g., change the length of one or more fiber optic cables 408) of the design of the operable optical span in accordance with a case type. Again, there are four basic kinds of case types in the margin analysis which have been referred to as the sensitivity case, the simultaneous case, the independent case and the channel case. An example of a margin analysis using the sensitivity case on the optical span 400 is provided below with respect to FIGS. 4H and 4i. FIG. 4H illustrates a changed optical span 400' where the ILA-1 is moved to the right by one increment or 2 kilometers and ILA-2 through ILA-7 remain in their original positions. Again, the sensitivity case is where the processor 110 determines an allowable amount of change in a position of an in-line amplifier (e.g., ILA-1) relative to adjacent amplifiers (e.g., B and ILA-2).

At step 306c and 306d, the optical route design system 100 analyzes (step 306c) the design of the changed optical span (e.g., changed optical span 400') and determines (step 306d) whether the design of the changed optical span is still an operable optical span. The aforementioned optimizing routine (similar to step 304) can be used to determine whether the design of the changed optical span is still an operable optical span. In particular, the optical route design system 100 uses the "Pre-emphasize" parameter of 3 (FIG. 4G) to make 3 iterations of the optimizing routine in an attempt to determine whether the changed optical span can be optimized so that it is still an operable optical span. It should be understood that in the optimizing routine the larger the number of iterations that are to be performed the more accurate the results are but the longer it takes the processor 110 to perform the calculations. Typically, two through six iterations of the optimizing routine results in a very accurate result.

Figure 4I:
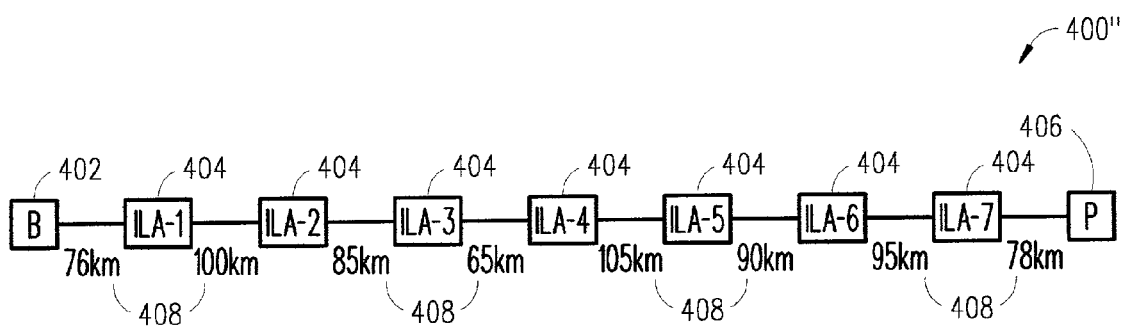

If the design of the changed optical span is still an operable optical span, then the optical route design system 100 incorporates (step 306e) the next incremental change into the same component of the optical span in accordance with the case type. FIG. 4I illustrates a changed optical span 400" where the ILA-1 is moved to the right by another increment or 4 kilometers and ILA-2 through ILA-7 remain in their original positions. Then the optical route design system 100 repeats the analyzing step 306c and the determining step 306d to determine whether design of the changed optical span (e.g., changed optical span 400") is still an operable optical span. These steps 306c, 306d and 306e are repeated by the optical route design system 100 until the changed optical span can no longer be optimized so that it is an operable optical span.

Figure 4J:
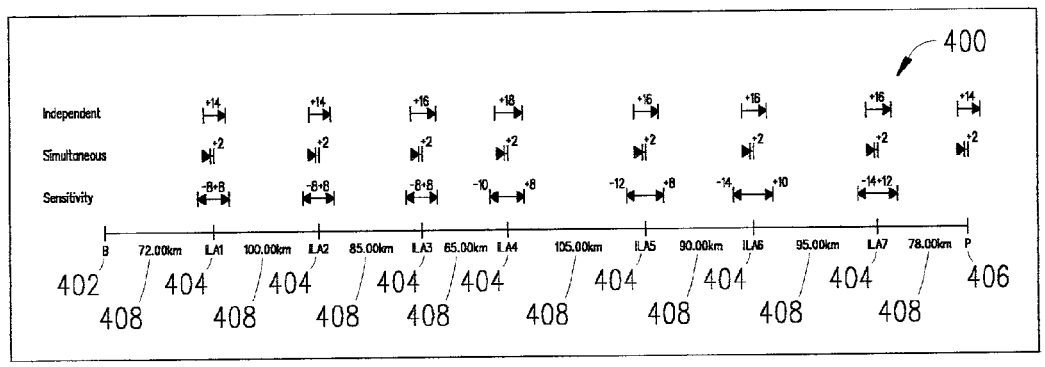

Once the optical route design system 100 determines that the design of the changed optical span is an inoperable optical span, then the previous acceptable increment is identified (step 306f) as the margin limit for that element. FIG. 4J is a diagram illustrating the results of the margin analysis on the exemplary optical span 400. An examination of the results of the sensitivity case show that the optical span 400 can still operate properly if the location of ILA-1 varies +/−8 kilometers relative to the adjacent amplifiers B and ILA-2. In particular, the optical span 400 can still operate properly if the first segment of the fiber optic cable 408 is as long as 72+8=80 km and the second segment of the fiber optic cable 408 becomes as short as 100−8=92 km, or the first segment of the fiber optic cable 408 is as short as 72−8=64 km and the second segment of the fiber optic cable 408 becomes as long as 100+8=108 km. This margin analysis assumes that only ILA-1 moves and the remaining ILA-2 through ILA-7 do not move.

At step 306g, the optical route design tool 100 then determines whether all components of the optical span and all case types have been analyzed. If not, the optical route design system 100 incorporates (step 306h) an incremental change into the next component of the design of the operable optical span in accordance with the case type and repeats steps 306c through 306g until all components of the optical span and all case types have been analyzed. In the present example associated with FIG. 4, the optical route design system 100 needs to complete the sensitivity case of the margin analysis on the remaining in-line amplifiers ILA-2 through ILA-7, and then perform the complete margin analysis on each component in the simultaneous case, the independent case and the channel case. The results of the margin analysis for the optical span 400 are described in more detail below with respect to FIG. 4J.

When the optical route design tool 100 determines that all the components of the optical span and all the case types have been analyzed, then the optical route design tool 100 can display (step 308) the results of the margin analysis to the user. Again, FIG. 4J illustrates such a display where the results of the exemplary margin analysis of the optical span 400 are displayed to the user. An examination of the results of the sensitivity case show that the optical span 400 can still operate properly if the location of ILA-2 varies +/−8 kilometers relative to the adjacent amplifiers ILA-1 and ILA-3. In particular, the optical span 400 can still operate properly if the second segment of the fiber optic cable 408 is as long as 100+8=108 km and the third segment of the fiber optic cable 408 becomes as short as 85−8=77 km, or the second segment of the fiber optic cable 408 could be as short as 100−8=92 km and the third segment of the fiber optic cable 408 becomes as long as 85+8=93 km. This margin analysis assumes that only ILA-2 moves and the remaining ILA-1 and ILA-3 through ILA-7 do not move. And, so on for the other ILAs. In other words, the sensitivity case shows how much anyone of the ILAs at one time can move relative to stationary ILAs on either side and still have an operable optical span 400.

The results of the simultaneous case show that all of the segments of the fiber optic cables 408 can change by 2 km (or the equivalent loss) if the change is introduced at the same time into all segments of the fiber optic cables 408. It should be understood that the results of the sensitivity case are analogous to the "unallocated margin" associated with the traditional optical route design tools except that with the present invention the user need not estimate the "unallocated margin".

The results of the independent case show that the first segment of fiber optic cable 408 can become 14 km longer provided the remaining seven segments of fiber optic cable 408 do not change. And, the second segment of fiber optic cable 408 can become 14 km longer provided the first segment and the remaining six segments of fiber optic cable 408 do not change. And, so on. In other words, the independent case identifies the amount that any one segment of fiber optic cable 408 in the design of the optical span 400 can change before the design fails, assuming that no other changes occur in any of the other segments of fiber optic cables.

The results of the channel case have not been shown in FIG. 4J. It should be noted that these four cases can be analyzed and tested from the perspective of "Beginning of Lfe", "End of Life", "West Direction", "East Direction" or any combination thereof. It should also be noted that the margin results of the present invention gives the user a broader idea as to the "robustness" of an optical span and also gives the user the ability to design an optical span as aggressively as the actual margin requirements permit. Moreover, the margin results determined by the optical route design system 100 and method 200 and 300 are more meaningful and accurate than the "unallocated margin" results associated with the traditional optical route design tools.

The margin and optimizing routines described above are just some of the features of the optical route design tools in the present invention. The Appendix includes a more detailed description of the capabilities of the optical route design tools in the present invention.

TABLE OF CONTENTS

1. PREFACE
   1.1 PURPOSE
   1.2 TERMINOLOGY
2. OPTICAL ROUTE DESIGN TOOL (ORDT)
   2.1 PRODUCT SCOPE
3. AMPLIFIER PROFILES (AMP)
   3.1 FEATURE SCOPE
   3.2 EXEMPLARY CAPABILITIES
4. APPLICATIONS (APP)
   4.1 FEATURE SCOPE
   4.2 EXEMPLARY CAPABILITIES
5. BILL OF MATERIALS (BOM)
   5.1 FEATURE SCOPE
   5.2 EXEMPLARY CAPABILITIES
6. CHROMATIC DISPERSION (CDSP)
   6.1 FEATURE SCOPE
   6.2 EXEMPLARY CAPABILITIES
7. CUSTOMER REPORTS (CRPT)
   7.1 FEATURE SCOPE
   7.2 EXEMPLARY CAPABILITIES
8. CHROMATIC DISPERSION COMPENSATION UNIT (DCU)
   8.1 FEATURE SCOPE
   8.2 EXEMPLARY CAPABILITIES
9. DESIGN ANALYSIS (DSGN)
   9.1 FEATURE SCOPE
   9.2 EXEMPLARY CAPABILITIES
10. PRE-EMPHASIS ANALYSIS (EMPH)
    10.1 FEATURE SCOPE
    10.3 EXEMPLARY CAPABILITIES
11. EQUIPMENT LIBRARIES (EQL)
    11.1 FEATURE SCOPE
    11.2 EXEMPLARY CAPABILITIES
12. FIBER LIBRARIES (FBL)
    12.1 FEATURE SCOPE
    12.2 EXEMPLARY CAPABILITIES
13. FORWARD ERROR CORRECTION (FEC)
    13.1 FEATURE SCOPE
    13.3 EXEMPLARY CAPABILITIES
14. NETWORK GRAPHICS (GRA)
    14.1 FEATURE SCOPE
    14.2 EXEMPLARY CAPABILITIES
15. INDEPENDENT PATHS (IND)
    15.1 FEATURE SCOPE
    15.2 EXEMPLARY CAPABILITIES
16. GRAPHIC INPUTS (INP)
    16.1 FEATURE SCOPE
    16.2 EXEMPLARY CAPABILITIES
17. INTERNET PROTOCOL BASED (IPB)
    17.1 FEATURE SCOPE
    17.2 EXEMPLARY CAPABILITIES
18. MINIMUM NETWORK (MIN)
    18.1 FEATURE SCOPE
    18.2 EXEMPLARY CAPABILITIES
19. MARGIN ANALYSIS
    19.1 FEATURE SCOPE
    19.2 EXEMPLARY CAPABILITIES
20. MESH NETWORK DESIGN (MSH)
    20.1 FEATURE SCOPE
21. OPTICAL ADD-DROP (OAD)
    21.1 FEATURE SCOPE
    21.2 EXEMPLARY CAPABILITIES
22. OLE COMPATIBILITY (OLE)
    22.1 FEATURE SCOPE
23. PRODUCT "X" CAPABILITY (PRX)
    23.1 FEATURE SCOPE
24. RING DESIGN (RNG)
    24.1 FEATURE SCOPE
25. ROUTE DESIGN REPORTS (RPT)
    25.1 FEATURE SCOPE
    25.2 EXEMPLARY CAPABILITIES
26. FUTURE FEATURE
27. ENGINEERING RULES (RUL)
    27.1 FEATURE SCOPE
28. SAVE AND RETRIEVE (SAR)
    28.1 FEATURE SCOPE
    28.2 EXEMPLARY REQUIREMENTS
29. SITE DEFINITIONS (SITE)
    29.1 FEATURE SCOPE
    29.2 EXEMPLARY CAPABILITIES

30. TL-1 COMMAND SCRIPTS (TL1)
    30.1 FEATURE SCOPE
31. COMPONENT TRACKING (TRK)
    31.1 FEATURE SCOPE
    31.3 EXEMPLARY CAPABILITIES
32. TUTORIAL (TUT)
    32.1 FEATURE SCOPE
    32.3 EXEMPLARY CAPABILITIES
33. VALIDATION CRITERIA (VAL)
    33.1 FEATURE SCOPE
    33.2 EXEMPLARY CAPABILITIES
34. INTERVIEW WIZARDS (WIZ)
    34.1 FEATURE SCOPE
    34.2 EXEMPLARY CAPABILITIES

1. Preface 1.1 Purpose

The text provided below further describes some of the features that can be implemented in the optical route design tools (e.g., Alcatel 1350 SD optical design tool) of the present invention.

1.2 Terminology

In general, all terms, acronyms, and abbreviations used below are consistent with the terminology currently in use within the optical field.

2. Optical Route Design Tool

This section contains a detailed description associated with the Optical Route Design Tool, referred to as the Alcatel 1350 SD.

2.1 Product Scope

1. The Alcatel 1350 SD, is a tool designed to assist users in doing accurate, comprehensive Optical Route design based on Optical Amplifiers and Dense WDM products. The tool provides a large number of features designed to facilitate the task of optical route design.

2. A focus of the tool is on designing optical routes, however, it is not be limited to designing optical spans only. The focus includes, but is not limited to, the following: 1) the ability to analyze the "working" and "protect" the portions of a route independently in both directions, where the parameters for one direction can be unique from the parameters in the other direction (referred to as "independent paths"), as opposed to a "mirror-image" approach; 2) the ability to perform Optical add-drop in accordance with the capability of the product the route is being designed for; 3) the ability to design routes for several Alcatel product types, specifically, the 1610 LHT, the 1640 OADM, and the 1686 European product; 4) the ability to handle multiple data rates; 5) the ability to account for, or predict, the effects of PMD, Chromatic Dispersion, and Dispersion Compensators; 6) the ability to determine required pre-emphasis curves; 7) the ability to work with multiple fiber types; both "standard" industry fiber and user-defined fiber; 8) the ability to save or load configurations, and the ability to save different levels of results, and 9) other requirements as defined in this document.

3. The optical route design system (ORDT) is based on a flexible, easy to use GUI interface. The ORDT can be based on Java, and can run on PC's or laptops running Windows 98 or Windows NT. The ORDT is also capable of running on a Sun workstation. The ORDT is designed in such a way as to allow straightforward upgrades ranging from minor upgrades to upgrades for doing Ring and Mesh designs.

3. Amplifier Profiles (AMP)

This section contains exemplary capabilities associated with the AMPLIFIER PROFILES in the Alcatel 1350 SD.

3.1 Feature Scope

1. The gain blocks for the various products addressed by the Alcatel 1350 SD are modeled in software. The resultant models are called "profiles". When possible, multiple "profiles" of each gain block are maintained so as to be able to define a statistical variation of the performance of each gain block. To incorporate this statistical variation capability into the route being designed, the user has the ability to tell the ORDT to use different library entries (amplifier profiles) for different amplifiers in the route; rather than the ORDT's default behavior which is to use a single default profile for all amplifiers in the design that are of a given type. User entry is a singe entry, which instructs the Alcatel 1350 SD to diversify the amplifier profiles in the design, or the user can make individual selections for different amplifier profiles. The ability to incorporate this feature depends on the timeframe in which a number of different amplifier examples can be characterized. Alternatively, an approach that uses statistical methods can be used to create, via software, statistical variations artificially.

3.2 Exemplary Capabilities

The following are some exemplary capabilities of AMPLIFIER PROFILES.

AMP-1 (R) Each amplifier type can have a "default" profile. Unless specified otherwise by the user, the ORDT can use the appropriate default profile for any amplifier type specified in the design.

AMP-2 (R) The user can have the ability, by means of a single, simple entry, to instruct the ORDT to use a distribution of profiles for the amplifiers in the design. This distribution of statistically-variant profiles can be random in nature, but the ORDT can have the means to specify and record the profiles that were used for a given design, so that the design can be re-created exactly. Additionally, the user can have the ability to instruct the ORDT to define a new distribution of profiles if desired.

AMP-3 (R) The user can also have the ability to manually specify different amplifier profiles, rather than relying on the automated feature of the ORDT.

AMP-4 (R) Upgrades and updates to the amplifier profile files can be transparent to the actual Alcatel 1350 SD. Existing design configurations that have been archived can be re-created and are able to be re-simulated using the updated amplifier profiles.

AMP-5 (R) All the amplifier models, and the results of the ORDT when using a specific model should be verified against lab data.

4. Applications (APP)

This section identifies some high-level features, capabilities and limitations that can define the APPLICATIONS in Alcatel 1350 SD.

4.1 Feature Scope

The Alcatel 1350 SD defined herein can be optimized for OSNR analysis of point-to-point and OADM optical routes for N×OC-48 and N×OC-192 applications where N=number of channels. The product upon which a design is based determines the maximum value of "N". Additional application requirements could involve a number of different data rates and signal formats, such as gigabit Ethernet. The Alcatel 1350 SD can also have the capability, via either embedded or separate callable routines, to do limited nonlinear analysis, specifically FWM. See section "CDSP" below for more details.

4.2 Exemplary Capabilities

The following are some exemplary capabilities of APPLICATIONS.

APP-1 (R) The following are some exemplary requirements for the Alcatel 1350 SD: 1) OSNR analysis of a design based on accumulated amplifier noise; 2) pre-emphasis determination and optimization; 3) PMD and Chromatic dispersion limits analysis; 4) per-channel power analysis; 5) graphic and text result reporting capabilities; 6) file management capabilities; 7) results graphing capability; 8) Margin and Sensitivity Analysis capability; 9) FWM capabilities; 10) add-drop capability; 11) Mid-stage DCU and Attenuation analysis and optimization capability; 12) Chromatic Dispersion map generation capability; 13) automatic determination of required build-out attenuation; and 14) FWM capability.

APP-2 (R) The Alcatel 1350 SD may interface to other tools in a "seamless" fashion. Examples of these other tools are: BOM generators, Network Design Tools, Network Managers, Full Optical Simulators.

5. Bill Of Materials (BOM)

5.1 Feature Scope

The ability to create a list of equipment needed to implement a specified route design can be available as a User Option. It is desired that the BOM be generated via an interface to ORACLE, or other existing BOM tools.

5.2 Exemplary Capabilities

The following are some exemplary capabilities of BILL OF MATERIALS.

BOM-1 (R) The preference is for a "link" interface (into ORACLE or other relevant configuration tool) that will pass the appropriate information to the Config Tool so as to allow that tool to build (and price) a BOM for the design represented in the Alcatel 1350 SD. There can be an interface between the Alcatel 1350 SD and the currently existing Config Tool that allows communication between the 2 tools.

BOM-2 (R) As a possible alternative to an interface into the Config Tool, a simplified BOM capability could be defined and incorporated into the Alcatel 1350 SD. This could be a simple look-up in a database of configurations, based on standard rack configurations. The method defined in BOM-1 is preferred.

BOM-3 (R) If the alternative described in BOM-2 is chosen, it is preferred that the simplified BOM tool exist as a separate tool that can be called or linked to and directly from the Alcatel 1350 SD.

6. Chromatic Dispersion (CDSP)

This section describes the CHROMATIC DISPERSION analysis capabilities of the Alcatel 1350 SD.

6.1 Feature Scope

1. The Alcatel 1350 SD is capable of analyzing any TDM to TDM section of a route for Chromatic Dispersion limitations, and can identify to the user any portion of the design that is limited due to Chromatic Dispersion and therefore needs dispersion compensation or regeneration. The ORDT is capable of performing Chromatic Dispersion limitation analysis on a per-channel basis so as to be able to differentiate, from a Chromatic Dispersion perspective, pass-through channels from add-drop channels that have been regenerated as a result of the add-drop. This analysis can be done using Chromatic dispersion parameters defined by the fiber model(s) in-use. Additionally, the Alcatel 1350 SD is capable of generating Dispersion Compensation Maps based on user-specified DCU locations and amounts. In addition, the Alcatel 1350 SD is also capable of generating Dispersion Maps automatically, based upon engineering rules can be derived from both lab and simulation data.

6.2 Exemplary Capabilites

The following are some exemplary capabilities in CHROMATIC DISPERSION.

CDSP-1 (R) Since Chromatic dispersion in fiber is wavelength-sensitive, and since different data rates have different tolerances to Chromatic Dispersion, the ORDT can take into account the data rate and wavelength of each channel when analyzing Chromatic Dispersion.

CDSP-2 (R) Since every span section of any given route could possibly utilize different fiber with different Chromatic Dispersion characteristics, the software can analyze each span section independently for the effects of, or the amount of, accumulated Chromatic Dispersion for each independent segment, and sum the accumulation from each independent segment over the entire span. This can be done on a per-channel basis, as channels of different data rates will have different limitations. The slope (i.e., wavelength dependence) of the Chromatic Dispersion characteristics can be taken into account in the analysis.

CDSP-3 (R) The analysis of accumulated Chromatic Dispersion on a per-wavelength basis can be able to accommodate add-drop channels.

CDSP-4 (R) The ORDT can indicate to the user the following: 1) Whether or not dispersion compensation is required and 2) recommendations for how to distribute the required dispersion compensation (i.e., a chromatic dispersion map).

CDSP-5 (R) Chromatic Dispersion Analysis can be implemented as a GUI function rather than the CORE engine function.

CDSP-6 (R) The format of the resultant Chromatic Dispersion Map can be text and/or graphics.

7. Customer Reports (CRPT)

This section contains exemplary capabilities associated with the CUSTOMER REPORTS feature in the Alcatel 1350 SD.

7.1 Feature Scope

The Alcatel 1350 SD can be capable of generating reports, detailing and describing the Route Design that can be customized by or for a user. Users can have the ability to select the desired report information from a selection list of reports. Specific reports can be both tabular and graphical.

7.3 Exemplary Capabilities

The following are the some exemplary capabilities in CUSTOMER REPORTS.

CRPT-1 (R) OSNR and Per-Channel Power results can be available in both table and graphics format.

CRPT-2 (R) All reports can be printable

CRPT-3 (R) Graphics format for reports can include 2-D and 3-D graphs

CRPT-4 (R) The user can select different chart types: 1) Line Chart, 2) Scatter Plot and/or 3) Bar graph.

CRPT-5 (R) On 2-D charts, the user can select between "channel" or "site" as the parameter for the X-axis.

8. Chromatic Dispersion Compensation Unit (DCU)

This section contains exemplary capabilities associated with the CHROMATIC DISPERSION COMPENSATION UNIT in the Alcatel 1350 SD.

8.1 Feature Scope

1. The Alcatel 1350 SD can be capable of allowing the user to define the presence of, and amount of, any Dispersion Compensation that the user may want or need to define for the route being designed. Any Chromatic Dispersion Analysis feature, when doing the analysis, can be capable of taking into account the effects of any Chromatic Dispersion units that have been defined by the user. In addition, the Alcatel 1350 SD can be capable of automatically constructing a DCU map based upon engineering rules.

8.2 Exemplary Capabilities

Following are some exemplary capabilities for a CHROMATIC DISPERSION COMPENSATION UNIT.

DCU-1 (R) The Alcatel 1350 SD can be capable of allowing the user to define the presence, amount, and location of Dispersion Compensation Units, and can incorporate the effects of any specified DCU in the Chromatic Dispersion Analysis of a route or span. Also, any Loss effects (if applicable) of specified DCU can be taken into account during the analysis of the Route and the optimization of mid-stage attenuation.

DCU-2 (R) Additionally, should the User not define a specific DCU, then the Alcatel 1350 SD is capable of analysing the route from a Chromatic Dispersion standpoint, identify any needed DCU, and identify the correct way to incorporate the DCU into the route, via a Chromatic Dispersion Map. Detailed requirements are provided in the APP and CDSP sections.

DCU-3 (R) The Alcatel 1350 SD can include the "dispersion slope" in the analysis and creation of the Chromatic Dispersion map.

DCU-4 (R) The format of the resultant Chromatic Dispersion Map can be both text and graphic.

9. Design Analysis (DSGN)

This section contains a brief description about the general DESIGN ANALYSIS capabilities of the Alcatel 1350 SD optical route design tool, as they relate to worst-case/best-case scenarios.

9.1 Feature Scope

The Alcatel 1350 SD can allow for the definition/specification of both "End of Life" (EOL) and "Beginning of Life" (BOL) parameters in the characterization and definition of the route. The output of the Alcatel 1350 SD can include distinct and unique results for both the EOL and BOL case. This includes optimization and pre-emphasis. See detailed requirements below.

9.2 Exemplary Capabilities

The following are some exemplary capabilities in DESIGN ANALYSIS.

DSGN-1 (R) The Alcatel 1350 SD can be capable of analyzing the design based on "Max Power/Min Loss" (which represents "Beginning of Life", or BOL) and "Min Power/Max Loss" (which represents "End of Life" or EOL) parameters.

DSGN-2 (R) Additionally, analysis of the route can be done using variations in one or more of the "Max Power/Min Loss" and the "Min Power/Max Loss" margin parameters (unallocated, splice loss, aging, loss rate, amp performance, etc) as identified by the user.

10. Pre-Emphasis Analysis (EMPH)

This section contains a brief description about the PRE-EMPHASIS ANALYSIS capabilities of the Alcatel 1350 SD.

10.1 Feature Scope

1. The Alcatel 1350 SD can be capable of determining, based upon received OSNR values, the channel pre-emphasis values (curve) required at a Tx site. This capability includes 1) the ability to account for regenerated channels or optical add/drop channels, 2) the ability to accommodate the effects of the presence of FEC in some or all of the channels, 3) the ability to determine different emphasis values for each direction of each route in route-diverse cases.

10.2 Exemplary Capabilities

The following are some exemplary capabilities in the PRE-EMPHASIS ANALYSIS.

EMPH-1 (R) The Alcatel 1350 SD can have the ability to track the OSNR situation of add/drop wavelengths, and account for these add/drop channels in the emphasis analysis routine. Thus, the pre-emphasis routine is able to account for add-drop channel, OSNR and channel power so as to be able to "maintain" the spectral shape at drop/add channel locations.

EMPH-2 (R) The Alcatel 1350 SD can have the ability to account for the different OSNR requirements of each channel, and develop pre-emphasis values accordingly. Channels with FEC, especially OC-48 channels with OOB-FEC have a far lower OSNR requirement than do OC-192 channels without FEC, and so can probably be launched at a much lower per-channel level. The emphasis routine can take into effect the OSNR requirements of EACH channel, so as to share available optical power in an optimal way.

EMPH-3 (R) Since the Alcatel 1350 SD can consider East and West, Working and Protect paths as independent paths, the pre-emphasis requirements for these paths are able to be considered and analyzed independently.

EMPH-4 (R) The pre-emphasis routine can observe any constraints that reflect hardware. For example, the pre-emphasis routine can provide curves that reflect the "delta" that can be provisioned by the equipment. Also, the pre-emphasis routine does not suggest values that cause the lower limits of per-channel powers to be violated.

EMPH-5 (R) In determining the pre-emphasis values, the routine can be mindful of any requirements for minimum per-channel receive power levels. The routine can determine pre-emphasis values that satisfy the following constraints: 1) max allowable delta between channels, 2) minimum per-channel receive power levels, and 3) optimal receive OSNR values EMPH-6 (R) When attempting to optimize or correct receive power levels, the pre-emphasis routine should not cause and channel OSNR values to fail in an effort to correct a low receive channel power situation.

EMPH-7 (R) The receive power level requirements are determined from the specifications for the receive equipment.

11. Equipment Libraries (EQL)

This section contains a brief description about some of the exemplary capabilities associated with the EQUIPMENT LIBRARIES in the Alcatel 1350 SD.

11.1 Feature Scope

The Alcatel 1350 SD can incorporate libraries that define the relevant information and parameters for specific product applications of the Alcatel 1350 SD.

11.2 Exemplary Capabilities

The following are some exemplary capabilities of EQUIPMENT LIBRARIES.

EQL-1 (R) The Alcatel 1350 SD can be structured to use equipment profile files that are maintained in Equipment Profile Library. These files can contain the necessary parameters and information for different families of equipment. The Equipment Library files can be upgraded separately and individually, and apart from an upgrade of the Alcatel 1350 SD itself.

EQL-2 (R) Provisions can be made to allow custom entries in the library, and these custom entries can be maintained across updates. This functionality generally applies to custom, user-created fiber databases.

EQL-3 (R) Updates or Upgrades to the Equipment Profile Library are capable of being sent as a file attachment to an Internet e-mail message.

12. Fiber Libraries (FBL)

This section contains a brief description about some of the exemplary capabilities associated with the FIBER LIBRARIES in the Alcatel 1350 SD.

12.1 Feature Scope

The Alcatel 1350 SD can incorporate Fiber libraries that define the relevant information and parameters for specific fibers to be modeled and used for analysis by the Alcatel 1350 SD and any sub-programs or linked programs.

12.2 Exemplary Requirements

The following are some exemplary capabilities of FIBER LIBRARIES.

FBL-1 (R) Software can be structured so as to use a fiber library, containing necessary parameters for fiber characteristics that may be updated apart from an entire update of the tool. The Fiber models in the Fiber library can address all relevant aspects of fiber performance, including the attenuation slope across wavelength, Chromatic Dispersion characteristics across wavelength, PMD, effective area, and any others deemed relevant. As well, users can have the ability to edit, re-characterize, or specify unique custom fiber characteristics. Any user-made changes or custom user fiber profiles can be provided and maintained across updates.

FBL-2 (R) The library can be made available in encrypted form over the internet, in the form of a binary attachment to an e-mail message.

13. Forward Error Correction (FEC)

This section contains a brief description about some of the exemplary capabilities associated with the FORWARD ERROR CORRECTION aspect in the Alcatel 1350 SD.

13.1 Feature Scope

Forward Error Correction, or FEC is a technique used to allow for longer span distances. The effect of FEC is to essentially allow for lower OSNR requirements at the receive end for those channels which incorporate FEC. The Alcatel 1350 SD can allow the user to specify whether or not FEC is used on a per-channel basis. The per-channel OSNR requirements default to specific values depending on channel data rate and whether or not FEC is being used. These default values can be changed by the user if necessary. The Alcatel 1350 SD must have the ability to do OSNR analysis based on different OSNR limits for channels with FEC and channels without FEC, and display "pass/fail" information referenced to those differences in OSNR requirements. The type of FEC (In-Band FEC, or Out Of Band FEC) can be specified by the user, on a per-channel basis. Additionally, FEC can be defined as "on" or "off" for any given channel over any given segment, route, or span that is configured to provide FEC capability. Channels using FEC will have specific OSNR requirements as determined by R & D, and defined below. Specifying FEC will automatically cause the target OSNR for that channel to change to the default FEC OSNR target value.

13.2 Exemplary Capabilities

The following are some exemplary capabilities of FORWARD ERROR CORRECTION.

FEC-1(R) The Alcatel 1350 SD can be capable of allowing the user to specify, on a per-channel basis, those channels that use FEC. The actual possibilities (selection choices) are: 1) No FEC, 2) In-Band FEC (IB-FEC), or 3) Out-Of-Band FEC (OOB-FEC). The selection chosen will determine the default value for OSNR for that channel. The defaults are as shown:

| Data Rate | OSNR, No FEC | OSNR, TB-FEC | OSNR, OOB-FEC |
|---|---|---|---|
| OC-48 | 21 db | N/A | 12 db |
| OC-192 | 25 db | 22.5 db | 18 db |

FEC-2 (R) The presence or absence of FEC has no impact on the pre-emphasis analysis requirements defined elsewhere in this document.

14. Network Graphics (GRA)

This section contains a brief description about some of the exemplary capabilities associated with the NETWORK GRAPHICS in the Alcatel 1350 SD.

14.1 Feature Scope

A graphical representation of the designed or specified network or route can be made available. The network representation can allow a user to point and click on a site, fiber, or other relevant particular and produce a model, which may be edited, of the factors and parameters considered for that site, fiber, or particular. The graphical representation can display relevant, high-level results (such as OSNR, Chromatic Dispersion) for the performance of each link or segment in the design. Re-analysis based on edited changes can be done from the graphical network presentation screen(s). Basically, the graphical representation is a summary of a previously created route design that allows parameters for fibers, wavelengths and equipment to be modified, and certain results to be seen.

14.2 Exemplary Capabilities

The following are some exemplary capabilities of NETWORK GRAPHICS.

GRA-1 (R) The graphical representation can drawn (displayed) at the request of the user.

GRA-2 (R) It can be possible to port the graphical representation to a printer.

GRA-3 (R) A "point and click" approach can be taken to editing the parameters defining the icons in the displayed network.

GRA-4 (R) The parameters that can be changed from the graphical display can include (but may not be limited to): 1) distances, 2) fiber characteristics, 3) aggregate output power of amplifiers, 4) per-channel FEC definitions, 5) per-channel OSNR requirements, 6) channel Add/Drop definitions, 7) the ability to specify additional in-line attenuation, 8) number of channels and channel wavelengths, etc.

GRA-5 (R) The user can be able to go back and forth between the graphical representation and the normal mode if desired. Provisions can be made so that any parameter that can be modified from the normal mode can, in some way, also be modified from the graphical representation.

15. Independent Paths (IND)

This section contains a brief description about some of the exemplary capabilities associated with the INDEPENDENT PATHS in the Alcatel 1350 SD.

15.1 Feature Scope

The Alcatel 1350 SD will have the ability to define and analyze the "East-West" and "Working-Protect" paths independently.

15.2 Exemplary Capabilities

The following are some exemplary capabilities of INDEPENDENT PATHS.

IND-1 (R) The Alcatel 1350 SD can be structured in such a way as to allow for independent definition of the "East" and "West" directions (E->W and W->E) and/or independent definitions of Working and Protect paths of a route and manage the way in which the CORE engine is used in analyzing the route.

IND-2 (R) Analysis/modification can be done on any route individually or simultaneously on all routes, depending on the parameter being modified. Some parameters are global.

IND-3 (R) If any route is a mirror image of another route (such as the East direction being a mirror image of the West), the user can specify this without having to manually specify both routes.

16. Graphic Inputs (INP)

This section contains a brief description about some of the exemplary capabilities associated with the GRAPHIC INPUTS in the Alcatel 1350 SD.

16.1 Feature Scope

The user can have the option of designing a route graphically by selecting a graphical network representation from a library of standard design representations that can then be modified by the user. For example, the user could, via wizards, select a "Linear Point to Multi-Point Network, Route Diverse, 4 ILA's in Working path, 5 ILA's in Protect path" from a library that contains a selection of "standard" network types. The selected network can be displayed, and as in the "Network Graphics" requirement, such that the user could then define or modify the parameters of the displayed design by clicking on the site or fiber of concern. Once defined, the design could then be analyzed, with results displayed as per the "Network Graphics" requirement.

16.2 Exemplary Capabilities

The following are some exemplary capabilities of GRAPHIC INPUTS.

INP-1 (R) The user can select a "generic" network architechure type from a library of types. These "network types" are high-level descriptions, such as the following: 1) "Point to Multi-Point", 2) "Optical Ring", 3) "Optical Mesh", and many others.

INP-2 (R) Once the "type" of network is selected, the users can be queried as to specifics related to that type, via an interview style. Relevant questions include, but are not limited to, the following: 1) how many ILA's are required? 2) how many OADM sites are required? 3) is the system route-diverse?

INP-3 (R) Once all queries are answered, the ORDT can draw a graphical representation of the defined network.

INP-4 (R) The user can then edit and define specific parameters such as fiber type, number of channels, etc, by double clicking on the appropriate icon.

INP-5 (R) Once the user has specified all parameters, the route can be analyzed, and relevant high-level results data can be displayed on the graph.

INP-6 (R) Detailed data for each point on the graph can be made available to the user by a simple method, such as right-clicking, etc.

17. Internet Protocol Based (IPB)

This section contains a brief description about some of the exemplary capabilities associated with the INTERNET PROTOCOL BASED aspects of the Alcatel 1350 SD.

17.1 Feature Scope

It can be possible to update or upgrade the Library files of the Alcatel 1350 SD via the Internet. All libraries can be upgradable in this manner, including: 1) the Amplifier Library, 2) the Equipment Library, and 3) the Fiber Library.

17.2 Exemplary Capabilites

The following are some exemplary capabilities of an INTERNET PROTOCOL BASED Alcatel 1350 SD.

IPB-1 (R) The Alcatel 1350 SD can be able to retrieve, via the internet, any updates to Amplifier, Equipment, or Fiber Libraries or files. The update can be done at the customer request.

18. Minimum Network (MIN)

This section contains a brief description about some of the exemplary capabilities associated with the MINIMUM NETWORK capability of the Alcatel 1350 SD.

18.1 Feature Scope

The Alcatel 1350 SD can be able to determine a "Least Number of Amplifiers" for a design based on minimal input information. A possible situation is where the total loss or distance is defined, the fiber is defined, and the number of channels is defined. Based on that info, the ORDT can determine how many equally spaced ILA's are required. This feature can be used for "quick and dirty" approximations for budgetary proposals and hypothetical situations.

18.2 Exemplary Capabilities

The following are some exemplary capabilities of the MINIMUM NETWORK feature.

MIN-1 (R) It is anticipated that only a basic knowledge of the "route" be known in order to use this feature: 1) overall distance (and fiber type), or overall loss, 2) data rates, 3) number of channels, 4) whether or not FEC is used, 5) OSNR requirements (which can be based on defaults as determined by the specified data rates, and FEC)

MIN-2 (R) Based on the above inputs, the Alcatel 1350 SD can determine the least number of amplifiers needed to implement the span. The assumption will be that all amps are equally spaced.

MIN-2.1 (R) The analysis that determines the approach to determining the minimal network can include the use of pre-emphasis routines, as well as mid-stage attenuation and build-out attenuation optimization routines.

19. Margin Analysis (MRGN)

This section contains a brief description about some of the exemplary capabilities associated with the MARGIN ANALYSIS capabilities of the Alcatel 1350 SD. For more details about the Margin Analysis feature see the description above with respect to FIGS. 1–4.

19.1 Feature Scope

The Alcatel 1350 SD can be able to perform a marginal analysis of the design to indicate to the user how "robust" the design is, and what types of changes it can tolerate. This capability eliminates the need for specifying any "unallocated margin" in the design. The specification of unallocated margin is undesirable due to the fact that any loss specified as unallocated is loss that affects the performance of the simulation, but in fact is not present in the physical design. Thus, results could be misleading. The Margin Analysis feature analyzes the design and determines the actual amount of margin in the design, and returns this information to the user in a graphical format.

19.2 Exemplary Capabilities

The following are some exemplary capabilities of the MARGIN ANALYSIS feature.

MRGN-1 (R) The Alcatel 1350 SD can perform a Margin Analysis based on loss or distance. Margin Analysis can be done by incrementally making changes to the design until the design fails. Optimization can be automatically used as part of this process. The user can have control of the granularity of the incremental changes by means of a control window. All results of the margin analysis can be graphical and printable.

MRGN-2 (R) There can be 4 cases, as described below. More cases may be added in the future.

MRGN-3 (R) Case #1 can be referred to as the "Sensitivity" case. In this case, changes made to the design are relative. In this case, the location of each In-Line amplifier location is changed relative to each site adjacent to it. The sensitivity case can tell a user how sensitive the design is to the position of one site being changed relative to the other sites. This analysis is done by means of changing each of the segment losses (distances) relative to the next segment. Thus, if during the analysis, a segment is made "shorter", the next segment is made "longer" by an equivalent amount, and vice-versa. Changes are made based on the specified granularity, and are done iteratively until the design fails. The margin is the results prior to the failure.

MRGN-4 (R) Case # 2 is the "Simultaeneous" case. This case involves changes that are not relative. In this case, the changes being made are made to all segments at the same time. This case continues iteratively until the design fails. The results of this case can be interpreted as per-segment margin.

MRGN-5 (R) case #3 is the "Independent" case. This case also involves changes that are not relative. In this case, changes are made to one segment at a time, with no changes to other segments. This case shows how much change any particular segment of the design can tolerate, so long as there are no changes to other segments.

MRGN-6 (R) Case #4 is for channel growth. Case #4 does not involve changes to the loss or distance of the segments. Rather, case #4 gives the user information as to how much the design can grow in terms of the number of channels before the basic design must change. The user can be able to specify whether the growth channels are OC-48, OC-192, or a 50% mix. The analysis of this case can indicate the point at which higher-output amps are required (if applicable), and the point at which the growth is maximized.

20. Mesh Network Design (MSH)

This section contains a brief description about some of the exemplary capabilities associated with the MESH NETWORK DESIGN capabilities of the Alcatel 1350 SD.

20.1 Feature Scope

The Alcatel 1350 SD can be able to analyze Mesh Networks.

21. Optical Add-Drop (OAD)

This section contains a brief description about some of the exemplary capabilities associated with the OPTICAL ADD-DROP capabilities of the Alcatel 1350 SD.

21.1 Feature Scope

The Alcatel 1350 SD can be capable of designing/analyzing routes that are point to point as well as routes that are point to multi-point that incorporate Optical add/drop channels. This feature encompasses the following capabilities: 1) the ability to consider the per-channel OSNR ramifications of add/drop channels and regenerated channels vs. "direct" and "pass-through" channels; 2) the ability to control the channel power level of Add channels so as to be able to re-create the proper spectrum, and 3) The ability is differentiate between "direct", "pass-through", and add/drop channels from a chromatic dispersion perspective.

Exemplary Capabilities

The following are some exemplary capabilities of the OPTICAL ADD-DROP feature.

OAD-1 (R) The Alcatel 1350 SD can be capable of encompassing the OSNR ramifications of add-drop channels from a systems perspective. For example, Channels that are dropped and added at midspan locations may be able to be launched at significantly lower levels than pass-thru channels. The Alcatel 1350 SD can be capable of tracking the OSNR of all channels including add-drop channels, and can account for the fact that "add" channels are essentially regenerated from an OSNR perspective. This can automate the determination of minimum per-channel launch power and OSNR so that all channels, including those dropped and added, have sufficient power and OSNR at the receive ends of the channels.

OAD-2 (R) The Pre-emphasis routine can also be able to account for add-drop channels, so that any pre-emphasis requirements or determinations can include the effects of drop and add channels. This has multiple ramifications: 1) the required pre-emphasis curve at the terminals ends could be impacted in such a way as to allow "pre-emphasis" of pass-thru channels so that long-haul channels receive sufficient power, and drop channels receive only the power they need to reach the drop location, and 2) determining the required level of add channels, i.e., mid-span "pre-emphasis" so that they receive only the appropriate amount of power needed.

OAD-3 (R) Consistent with the requirement for independent paths, the Alcatel 1350 SD can be capable of analyzing add-drop routes from the perspective of east-west and working-protect.

OAD-4 (R) In addition to OSNR, the Alcatel 1350 SD, or an associated callable program, such as CDAT described in APP and CDSP sections, can keep track of the chromatic dispersion accumulation for each channel, including drop and added channels.

OAD-5 (R) The Alcatel 1350 SD can be made to account for different data rates in add-drop applications. For example, a drop channel could be OC-48, and the add channel could be OC-192. The difference in data rates impact accumulated chromatic dispersion considerations, as well as relative channel power considerations and per-channel OSNR requirements.

22. Ole Compatibility (OLE)

This section contains a brief description about some of the exemplary capabilities associated with the OLE COMPATIBILITY feature of the Alcatel 1350 SD.

22.1 Feature Scope

The Alcatel 1350 SD can be able to produce reports for exchange with applications such as Excel and Word. The Alcatel 1350 SD can also be able to accept an Excel spreadsheet as input. This can be the unit of exchange between customers and Network Engineering.

23. Product "X" Capability (PRX)

This section contains a brief description about some of the exemplary capabilities associated with the PRODUCT "X" CAPABILITY of Alcatel 1350 SD.

23.1 Feature Scope

The Alcatel 1350 SD and/or associated libraries are designed in such a way as to allow customers to specify, to Alcatel, a competitor's product profile (hardware characteristics), which can then be easily modeled for use by the Alcatel 1350 SD in doing design and/or analysis of a route that is based on competitor's equipment.

24. Ring Design (RNG)

This section contains a brief description about some of the exemplary capabilities associated with the RING DESIGN capabilities of the Alcatel 1350 SD.

24.1 Feature Scope

The Alcatel 1350 SD can be adapted to permit the design of Ring Networks.

25. Route Design Reports (RPT)

This section contains a brief description about some of the exemplary capabilities associated with the ROUTE DESIGN REPORTS feature of the Alcatel 1350 SD.

25.1 Feature Scope

The ORDT can be capable of producing both summary ("executive") and detailed reports as described below.

25.2 Exemplary Requirements

The following are some exemplary capabilities of the ROUTE DESIGN REPORTS.

RPT-1 (R) The ORDT can produce route design "Results" reports in .html format. These .html report files can be loaded into other programs such as Excel for manipulation by the user. The Results reports can include "End of Life" and "Beginning of Life" information.

RPT-2 (R) The user can be able to select the desired reports to be created from a list of possible reports. All information concerning the design can be available in one or more reports. This includes design configuration information and fiber information.

RPT-3 (R) The user may select more than one report at a time. If multiple reports are selected for creation, they can be merged into one report. Individual report files can exist in .html format.

RPT-4 (R) Along with a list of possible reports, the Reports function can show a file list of the user's specified directory so that the user may specify a specific "job" for which to create reports.

26. —Future Feature—(MMM)

27. Engineering Rules (RUL)

This section contains a brief description about some of the exemplary capabilities associated with the ENGINEERING RULES for the Alcatel 1350 SD.

27.1 Feature Scope

The Alcatel 1350 SD can make use of refined engineering rules resulting from the OCEAN tool and other tools. This may also include the generation, by the tool, of OCEAN-ready input files to be used in more exacting simulations.

28. Save and Retrieve (SAR)

This section contains a brief description about some of the exemplary capabilities associated with the SAVE AND RETRIEVE feature of the Alcatel 1350 SD.

28.1 Feature Scope

The Alcatel 1350 SD can have the ability to save and retrieve (load) complete configurations. This includes the capability to read config files created by previous releases of the ORDT.

28.2 Exemplary Capabilities

The following are some exemplary capabilities of the SAVE AND RETRIEVE feature.

SAR-1 (R) Saving a configuration can include saving all relevant parameters, models used, etc, so as to allow total definition and re-creation of any given design. The user can be able to specify the file location and file name.

SAR-2 (R) The user can also be able to save the detailed results of the analysis of the route. The user can be able to specify a file name and location. The Detailed Results file can be associated with the config file by filename.

SAR-3 (R) The "Retrieve Config" function can allow the user to specify the config file desired. The selected file can then be loaded and displayed. The user then can do an analysis of the newly loaded configuration.

SAR-4 (R) The user can also be able to view (via the REPORTS functionality) a "Detailed Results" file that is associated with any given configuration, so that those results can be examined at any time.

29. Site Definitions (SITE)

This section contains a brief description about some of the exemplary capabilities associated with the SITE DEFINITIONS feature of the Alcatel 1350 SD.

29.1 Feature Scope

The Alcatel 1350 SD can allow flexibility in the definition of a site. For example, terminal sites should have the option of Booster Amps, Pre-Amps. In-Line sites should be able to be defined as "Pass-Through" sites (no amps), OADM sites, or ILA sites. "Pass-Through" sites can be defined in terms of loss, which will have default values that can be modified by the user. Some In-Line sites may include regenerators (per-channel regens or OADM channels).

29.2 Exemplary Capabilities

The following are some exemplary capabilities of the SITE DEFINITIONS feature.

SITE-1 (R) Each site can be definable as to the type of site, i.e., 1) Booster, 2) In-Line Amplifier (ILA), 3) Pre-Amp, 4) Add/Drop, 5) Regen, 6) Pass-Thru, 7) Raman, 8) AGE SITE-2 (R) The user can be able to specify those sites that will incorporate optical switching (OADMs and Optical Cross-Connects).

SITE-3 (R) For all site types, and if required, the user can be able to specify both the aggregate output power desired, and optionally, the per-channel output power desired. If the Alcatel 1350 SD is instructed to determined pre-emphasis requirements, the pre-emphasis levels determined by the Alcatel 1350 SD can override the user-specified channel powers, but the Alcatel 1350 SD can be capable of displaying the Delta between user-specified channel powers, and channel powers determined by the pre-emphasis analysis.

SITE-4 (R) For all sites, the user can be able to specify the specific amp profile to be used. It is further desired, if statistically-variant amp profiles are available, that the user be able to instruct the Alcatel 1350 SD to use a statistical distribution of amplifier models, within any given amp type. That is, Boosters, ILA,s and Pre-Amps can vary statistically within their own type.

SITE-5 (R) Pass-Thru sites can be defined in terms of attenuation. Defaults can be used, however, the user can have the ability to modify the defaults if required.

SITE-6 (R) For Add/Drop sites, the user can be able to specify the add and drop channel numbers (or wavelengths). Further, the "starting" OSNR of Add channels can use a default value based on Alcatel equipment that can be modified by the user if required.

SITE-7 (R) For Regen sites, the user can be able to specify which channels are being regenerated. The "starting" OSNR of the regenerated channels can be determined by defaults that are relevant to Alcatel equipment, however, these values can be modified by the user if necessary.

SITE-8 (R) For all sites, the user can be able to specify the name for that site. Name length may be limited to 32 characters.

30. TL-1 COMMAND SCRIPTS (TL1)

This section contains a brief description about some of the exemplary capabilities associated with the TL-1 COMMAND SCRIPTS generated by the Alcatel 1350 SD.

30.1 Feature Scope

Alcatel 1350 SD can be able to produce a set of TL1 (or relevant language) commands compatible with the product profile being used. May require becoming a part of the product profile.

31. Component Tracking (TRK)

This section contains a brief description about some of the exemplary capabilities associated with the COMPONENT TRACKING feature of the Alcatel 1350 SD.

31.1 Feature Scope

As a full documentation feature, the Alcatel 1350 SD can be capable of providing a report that identifies all of the software components that were used to design and analyze any given route. This includes CORE release, GUI release, equipment versions, and device libraries and profiles. In the case where routes were designed using a random selection of statistically-variant device profiles, the Component report can identify specifically the models and/or profiles used. Thus, a route may be re-created exactly.

31.2 Exemplary Requirements

The following are some exemplary capabilities of the COMPONENT TRACKING feature.

TRK-1 (R) Any report concerned with detailing the designed route can identify all components of the ORDT used to design the route. For instance, the core release and GUI release can be identified, along with the versions of the equipment and fiber libraries.

TRK-2 (R) In the case where routes were designed using a random selection of statistically-variant device profiles, the Component report can identify specifically the models and/or profiles used, and where in the design they were used.

32. Tutorial (TUT)

This section contains a brief description about some of the exemplary capabilities associated with the TUTORIAL in the Alcatel 1350 SD.

32.1 Feature Scope

The Alcatel 1350 SD can contain a comprehensive tutorial (User's Guide) on the use and options of the tool. As well, several examples of Route Design can be made available to allow the user to see the reports generated by the tool. A "Definitions" section, defining various acronyms and span design issues, can also be provided. The capabilities/features described above are desired, but not required, for the engineering release (Release 3.0) of the tool. They are a requirement for any and all customer-versions of the tool.

This feature can reduce need for formal training and allow the user to get the most accuracy and functionality from the ORDT.

32.2 Exemplary Capabilities

The following are some exemplary capabilities of the TUTORIAL.

TUT-1 (R) There can be a "Definitions" help file that identifies and defines terms and acronyms that are relevant to optical span design, and DWDM optically-amplified routes. This can include graphical representations where applicable.

TUT-2 (R) There can be example configuration files that the user can load for educational purposes. There can be explanatory material included in these examples that explain to the user how the example was configured and why. The examples can include reports that are generated by the tool, with explanations as to format and content.

TUT-3 (R) Help files can be available. Help files can take the form of specific help tips available for each field of the tool that requires data entry (right click on the field to pop up help for that field) as well as a Help index that allows the user to select a topic from a complete list of topics. The Help index can be accessed by means of a "Help" button.

33. Validation Criteria (VAL)

This section contains a brief description about some of the exemplary capabilities associated with the VALIDATION CRITERIA feature in the Alcatel 1350 SD.

33.1 Feature Scope

The Alcatel 1350 SD results can be validated against lab data. Test cases can be defined that can define the configurations to be tested so that hardware planning can be done. The criteria can be used to measure the tool's accuracy and reliability.

33.2 Exemplary Capabilities

The following are some exemplary capabilities of the VALIDATION CRITERIA feature.

VAL-1 (R) Validation of the software can be done by defining test-case designs and determining the results for those test cases using the Alcatel 1350 SD. Those test cases then can be replicated in hardware and measured. Measured results can be compared with calculated results, and the conclusions drawn from the comparison of the data can be used to define any required modifications to the software.

VAL-2 (R) Test cases can be designed so as to vary and test as many relevant parameters as is reasonable.

34. Interview Wizards (WIZ)

This section contains a brief description about some of the exemplary capabilities associated with the INTERVIEW WIZARDS feature in the Alcatel 1350 SD.

34.1 Feature Scope

The Alcatel 1350 SD can provide an interview mechanism for obtaining the data necessary to do route design. There can be a Preferences Interview and a Design Interview. Slides may be moved from one interview session to another at the discretion of the user. The slide order may be changed.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method for analyzing the performance of a design of an optical span, said method comprising the steps of:
    selecting components that make-up the optical span;
    optimizing the optical span to make an operable optical span;
    performing a margin analysis on said operable optical span to determine how much change said operable optical span can tolerate in a plurality of case types before said operable optical span becomes an inoperable optical span, wherein said step of performing a margin analysis on said operable optical span further includes the steps of:
        receiving at least one parameter identifying incremental changes that are to be made to said operable optical span;
        incorporating an incremental change into at least one component of said operable optical span in accordance with a case type;
        analyzing the changed optical span;
        determining whether the changed optical span is an operable optical span;
        determining whether all of the components of the optical span and all of the case types have been analyzed; and
    presenting the results of the margin analysis to a user.

2. The method of claim 1, wherein said step of optimizing the optical span to make an operable optical span further includes the steps of:
    analyzing the design of the optical span;
    determining whether the design of the optical span is an operable optical span; and
    if not, analyzing a received signal spectrum and adjusting a transmitted signal spectrum to improve the characteristics of the received signal spectrum, wherein the received signal spectrum is continually analyzed and the transmitted signal spectrum is continually adjusted until there is an operable optical span.

3. The method of claim 1, wherein said step of determining whether the changed optical span is an operable optical span further includes the steps of:
    if yes, incorporating the next incremental change into the at least one component of said optical span in accordance with the case type and repeating the analyzing step and the determining step until the changed optical span is no longer an operable optical span;
    if not, identifying the previous incremental change as a margin limit for the at least one component in accordance with the case type; and
    wherein said step of determining whether all of the components of the optical span and all of the case types have been analyzed further includes the steps of:
        if not, incorporating an incremental change into the next at least one component of said operable optical span in accordance with the case type and repeating the analyzing step and the two determining steps until all of the components of the optical span and all of the case types have been analyzed;
        if yes, organizing the results of the margin limits.

4. The method of claim 3, wherein the case type is a sensitivity case during which there is determined an allowable amount of change in a position of an in-line amplifier relative to adjacent in-line amplifiers.

5. The method of claim 3, wherein the case type is a simultaneous case during which there is determined an allowable amount of change that can be made to the lengths of all segments of fiber optic cables.

6. The method of claim 3, wherein the case type is an independent case during which there is determined an allowable amount of change that can be made in one segment of fiber optic cable when there are no changes made to the remaining segments of fiber optic cables.

7. The method of claim 3, wherein the case type is a channel case during which there is determined how many channels can be tolerated by the design of the optical span.

* * * * *